United States Patent [19]

Abdelkader et al.

[11] Patent Number: 5,555,127
[45] Date of Patent: Sep. 10, 1996

[54] PLANAR HYBRID OPTICAL AMPLIFIER

[75] Inventors: Hatem Abdelkader, Harrisburg; Robert A. Boudreau, Hummelstown; Terry P. Bowen, Etters; Hongtao Han, Mechanicsburg, all of Pa.; Narinder Kapany, Woodside, Calif.; Paul R. Reitz, Palmyra, Pa.

[73] Assignee: The Whitaker Corporation, Wilmington, Del.

[21] Appl. No.: 573,910

[22] Filed: Dec. 18, 1995

Related U.S. Application Data

[63] Continuation of Ser. No. 269,408, Jun. 30, 1994, abandoned.

[51] Int. Cl.$^6$ .................................................. H01S 3/00
[52] U.S. Cl. ............................................ 359/341; 385/14
[58] Field of Search ..................... 385/14, 49; 359/341

[56] References Cited

U.S. PATENT DOCUMENTS

| | | | |
|---|---|---|---|
| 4,466,696 | 8/1984 | Carney | 350/96.20 |
| 4,592,619 | 6/1986 | Weidel | 350/96.11 |
| 4,760,569 | 7/1988 | Mahlein | 370/3 |
| 4,762,382 | 8/1988 | Husain et al. | 350/96.12 |
| 4,767,171 | 8/1988 | Keil et al. | 350/96.18 |
| 4,859,015 | 8/1989 | Krinsky et al. | 350/96.15 |
| 4,859,017 | 8/1989 | Brierley et al. | 350/96.15 |
| 4,892,374 | 1/1990 | Ackerman et al. | 350/96.15 |
| 4,904,036 | 2/1990 | Blonder | 350/96.11 |
| 4,989,935 | 2/1991 | Stein | 350/96.11 |
| 5,046,808 | 9/1991 | Chang | 385/13 |
| 5,056,096 | 10/1991 | Baker et al. | 372/6 |
| 5,101,461 | 3/1992 | Nakajima | 385/14 |
| 5,123,068 | 6/1992 | Hakoun et al. | 385/14 |
| 5,194,917 | 3/1993 | Regener | 385/14 |
| 5,280,550 | 1/1994 | Parriaux et al. | 385/50 |
| 5,355,248 | 10/1994 | Hadjifotiou | 359/341 |

FOREIGN PATENT DOCUMENTS

| | | |
|---|---|---|
| 0331338 | 9/1989 | European Pat. Off. . |
| 0404301 | 12/1990 | European Pat. Off. . |
| 0527604 | 2/1993 | European Pat. Off. . |
| 0562233 | 9/1993 | European Pat. Off. . |
| 03212984 | 12/1991 | Japan . |
| 04104231 | 7/1992 | Japan . |
| 06069570 | 6/1994 | Japan . |

OTHER PUBLICATIONS

*Electronics Letters*; "Twincore Erbium–Doped Fibre Amplifier With Passive Spectral Gain Equalisation"; vol. 29; No. 6; Mar. 1993; Laming et al.; pp. 509–510.

PCT International Search Report. International App. No. PCT/US95/08148.

*Primary Examiner*—Mark Hellner
*Attorney, Agent, or Firm*—W. Francos

[57] ABSTRACT

A planar hybrid optical amplifier is fabricated on a single crystal substrate. The components that are common to a variety of optical amplifier circuits are mounted on the substrate and the planar device that results is readily interchanged in various applications. In one embodiment the multiplexed signal consisting of light from a pump laser and an optical signal are introduced into a rare earth doped fiber which amplifies the input signal through stimulated emission of radiation.

7 Claims, 1 Drawing Sheet

PLANAR HYBRID OPTICAL AMPLIFIER

This application is a continuation of application Ser. No. 08/269,408 filed Jun. 30, 1994, now abandoned.

FIELD OF THE INVENTION

The invention relates to the use of silicon waferboard technology to make a low cost, passively aligned optical module that provides the basis for various applications of optical amplifiers. The module can be interchanged as the needs of a user changes.

BACKGROUND OF THE INVENTION

The advent of silicon waferboard technology has provided the vehicle by which accurate, passive alignment of optical components, both passive and active, can be accomplished with the additional benefit of reduced cost. The use of silicon bench technology to produce optoelectronic modules is disclosed in U.S. Pat. No. 4,904,036 to Blonder, incorporated herein by reference. Blonder discloses the use of a single crystal semiconductor base on which are mounted optoelectronic chips to create a modular transceiver, for example. Blonder discloses the use of v-grooves for holding optical waveguides and chips in well defined positions. The etching process to create the v-grooves is mature, and is disclosed for example in U.S. Pat. No. 4,210,923 to North, incorporated herein by reference. The Blonder further discloses the integral formation of silica waveguides on the base of monocrystalline material by chemical vapor deposition. Finally, the Blonder reference discloses the use of a waveguide to couple the evanescent wave of the main waveguide to a photodiode to monitor assembly functions or circuit operations. U.S. Pat. No. 4,989,935 to Stein, incorporated herein by reference, is another example of the fabrication of an optoelectronic device on a silicon wafer. The Stein reference discloses the use of a silicon wafer to forman integral optoelectronic transceiver with a laser chip functioning as a source and an optical receiver, a Schottky barrier diode. Further disclosed in the Stein reference is a wavelength multiplexer/demultiplexer which functions as a wavelength selective beamsplitter in the transceiver function. Finally, v-shaped grooves formed by anisotropic etching and dielectric waveguides formed on the silicon are also disclosed. Shown in FIG. 1 are the key components of a typical rare earth doped fiber amplifier. Generally the components of this type of amplifier are in bulk form, and the circuit is connected with a glass optical fiber to effect optical signal amplification. The particular example shows input optical isolator, output optical isolator 2, forward and reverse pump lasers 3 and 4. Wavelength division multiplexers (WDM's) for coupling pump laser into a common waveguide as well as for filtering residual pump energy from input and output leads are also shown. Finally, tap couplers 5 for monitoring the pump laser power and tap coupler 6 for monitoring amplifier power output power are shown in this amplifier circuit. The use and function of each of these components will be discussed herein. To effect the amplification of an optical signal in a rare earth doped fiber amplifier, the input signal to be amplified is chosen to be between 1520 and 1580 nm. This is the frequency range emitted from the stimulated emission of the coiled length of the erbium doped fiber 7. To effect stimulated emission, a signal from the pump laser 3 is chosen to be either 980 nm or 1480 nm from an appropriate source. The input signal is multiplexed with this pump signal, and then fed into the erbium doped fiber. The pump signal excites electrons in a lower energy state in the doped fiber to a higher state. In time this would effect the population inversion needed to permit lasing, in a proper laser cavity. Population inversion is achieved by pumping to excite electrons to a higher state. The electrons then decay rapidly to a metastable state (in many cases) with a longer lifetime, thereby enabling the required inversion. In an amplifier, this inversion is not utilized n the same way as in a laser, but rather is utilized to effect a more precise amplification frequency. This is clear from a consideration of Heisenberg Uncertainty, where the longer lifetime (greater uncertainty) makes the uncertainty in the energy (and hence the uncertainty in frequency) smaller. The input signal is then chosen to effect the stimulated decay of higher state electrons to a lower energy state. These quanta of light created by stimulated emission are of the same frequency and phase as the input wave, and thereby serve to amplify the input wave by constructive interference. This coherence effect is due to the coupling effect of the incident light pulse with the electrons in excited states in the doped fiber. The emitted photons are of the same direction of propagation as well. It is precisely this coherence of phase, frequency and direction of propagation that makes this kind of amplifier feasible. However, through the process of pumping and the introduction of the input signal to the erbium doped fiber, spontaneous emission occurs. Spontaneous emission of photons in the amplifying modes can adversely affect the amplification of the input signal through the introduction of noise. This noise is due to the fact that quanta of light emitted in the spontaneous emission will be of random phase and propagation direction. This light will destructively interfere with the light emitted through stimulated emission, and reduce the overall performance of the amplifier. Coherence is useful for various reasons. The first reason is that coherence makes feasible a greater variety of modulation and detection techniques, thus providing the system designer with more options. Coherent communication systems have a greater potential for better performance than do incoherent systems. For phase and frequency modulation, coherence is critical. Coherent detection techniques, for example heterodyning, require the phase of the received carrier and that of the local oscillator to be well defined and stable, so both light waves must be of a great degree of coherence. Clearly, it is of great importance to minimize as much as possible the spontaneous emission of light. For further details on the use of a rare earth doped fiber to effect amplification of an optical signal, see U.S. Pat. No. 5,056,096, incorporated herein by reference.

However, optical data transmission systems can differ greatly in their required components. As a consequence, for certain applications, the components shown in FIG. 1 may be necessary for some systems, and not needed for others. Often, an amplifier will require a single pump laser. The pump and signal may either be copropagating or counterpropagating, as determined by the relative importance of signal to noise ratio and output power requirements. Further, applications may not require two optical isolators, or, in some instances, even a single isolator, depending on the magnitude of signal reflections. System level design requirements can be established that can eliminate one or both of the isolators. In a similar manner, the use of a WDM to remove residual pump power is also a system consideration, and in some instances, such a pump filter may not be necessary. Finally, an output tap coupler is likewise a system issue, which for many signal branching applications will either not be required, or could be accomplished by other means. What is desired is a modular type device that incorporates the essential devices to effect amplification of via a gain medium such as a rare earth doped fiber, virtually independent of particular system requirements. FIG. 2 show the schematic of those components which are common to all designs of amplifiers. Specifically, the pump laser 23 is monitored by a tap coupler 25, and a WDM efficiently couples the input and pump signal to the gain medium (not shown).

What is needed is a multi-functional module that has formed or mounted thereon the essential components needed for optical amplifier systems. Such a device would allow the use of a such a module in a variety of applications, thereby enabling interchangeability as well as versatility, a worthwhile "off-the-shelf" consideration.

SUMMARY OF THE INVENTION

It is an object of this invention to provide a low-cost, highly accurate passively aligned module for optical amplifier circuits. Particularly, the invention discloses the fabrication on a monocrystalline substrate a pump laser the output of which is coupled via a multiplexer with the input signal to be amplified. The multiplexed signal is then coupled to a rare-earth doped fiber amplifier, external to the module. The configuration of the amplifier can vary, but the module is capable of functioning with the various configurations.

DETAILED DESCRIPTION OF THE PREFERRED EMBODIMENTS

Figure 1:
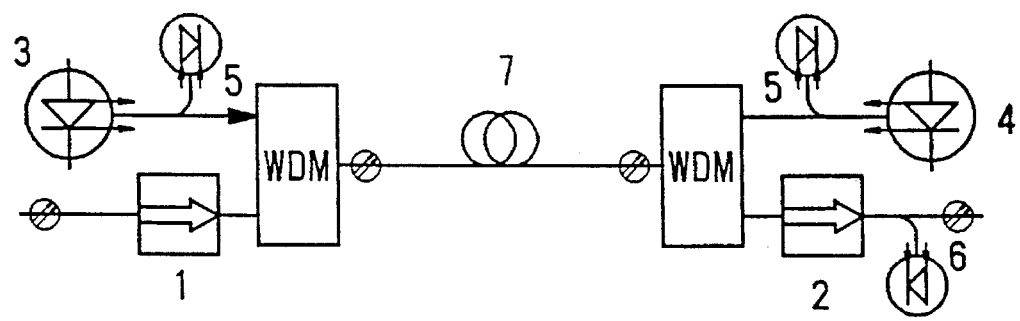
FIG. 1 is a schematic diagram of typical optical fiber amplifier with multiplexing/demultiplexing.
Figure 2:
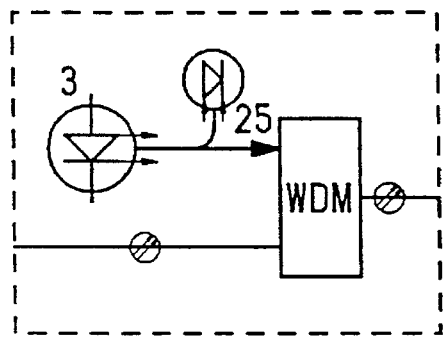
FIG. 2 is a schematic of the present invention showing the components common to all amplifier circuits.
Figure 3:
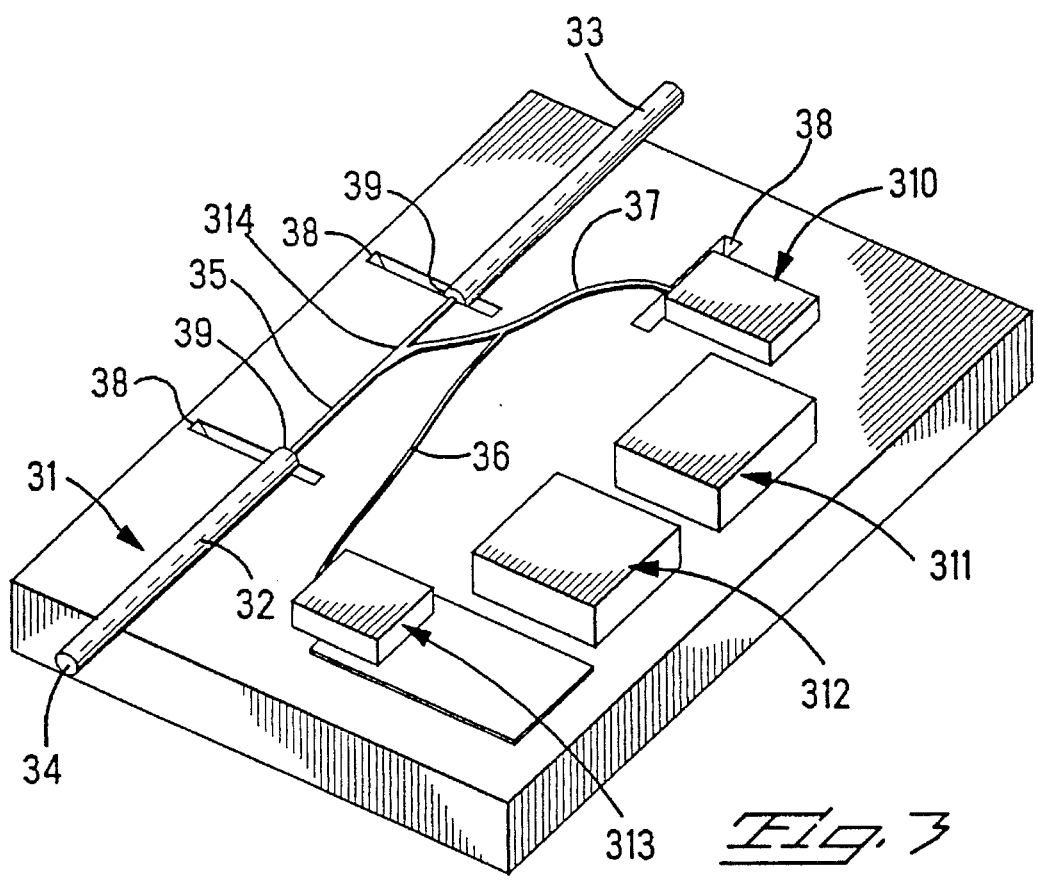
FIG. 3 shows the present invention fabricated on a single crystal waferboard.

Turning to FIG. 3, we see the planar implementation of the optical fiber amplifier shown schematically in FIG. 2. By techniques well known in the art, v-shaped grooves are etched into the monocrystalline substrate 31 to hold the optical fibers 32,33 which function to couple the input signal 34 to the amplifier circuit (not shown). The planar silica waveguides 35,36,37 are fabricated by microwave plasma chemical vapor deposition and reactive ion etching. Mode matching is usually required throughout the system, and can be effected, for example, by fabricating the silica waveguides in an approximately semi-circular shape such that the semi-circular core surrounded by a lower cladding and an upper cladding. The semi-circular core is fabricated to match the mode in the waveguide to that in the fiber 31,32. The cladding can be formed by oxidizing the silicon substrate and the core by deposition of phosphosilicate. This is but one means to create the waveguides, and is disclosed in the reference to Blonder above referenced. The end facets of the waveguides are cut by using a diamond saw, the groove created by such cuts are shown at 38. Standard single mode optical fibers or polarization selection single mode optical fibers 32,33 are positioned in the v-grooves and are thereby passively aligned with the waveguide 35 at 39. Finally, at the junctions at which the waveguide 35 couples the fiber, the fiber is cleaved at an angle consistent with the cut of the end facet of the waveguide 35, thereby reducing greatly the back reflections at the junction of the fiber to the waveguide. Also within the purview of the invention is the use of index matching material at junctions and laser welding and fusion arc welding may be employed to attach the fiber to the waveguide 35.

In order to effect multiplexing at the junction of the coupling waveguide 37 and the main waveguide 35, principals of evanescent wave physics are employed. In order to optically multiplex the pump light source with the input optical signal, the hope is that a great amount of the pump light is coupled into the waveguide 35, and a negligible amount of the input signal lost through coupling to the coupling waveguide 37. As is known in the art, there is a direct proportionality between the wavelength to be coupled and the length that the two waveguides are close and parallel. In this application, by keeping the length at which the waveguides 35 and 37 are parallel (at 314) short, there is great coupling for the pump light (roughly 980 nm) and poor coupling for the optical signal (1520–1580 nm). This configuration will also minimize the ill-effects of oscillation between evanescently coupled fibers. It is also conceivable that a slot could be cut in the junction between the fibers and a HOE be set therein for effecting multiplexing.

The configuration of FIG. 3 assumes the gain medium is externally deployed in conventional fiber form. Typically, such fibers derive improved performance by using a small mode field to maximize pump field intensity. As a consequence mode matching between the gain medium and connecting fibers or waveguides becomes a very important consideration. This can be effected by various techniques such as first splicing the gain medium to a standard single mode fiber with thermally expanded core fusion splices, then attaching the standard mode fibers to the v-grooves of the substrate. Alternatively, the ends of the main waveguide sections may be tapered to allow mode matching with direct attachment of the gain medium. Another consideration for the designer of such an amplifying is pulse-spreading which can occur if the amplification of the optical signal requires multiple traversals through the gain medium. The use of a loop fiber doped with a rare earth metal such as erbium which is pumped as described herein serves to enable amplification with as few as one pass through the loop. Finally, fiber to waveguide mode matching can be effected as described earlier. If it is desirable to deploy the gain medium on the planar substrate directly, waveguide tapering may again be used to allow direct coupling to standard single mode fiber in the v-grooves.

The pump source 310 is butt coupled to a single mode planar waveguide 37, that may be flared or otherwise modified to improve coupling efficiency. The end of this waveguide 37 may be angle cut to reduce back reflections, but is nonetheless cut with diamond saw to effect the but coupling as was previously described in the discussion of the coupling between the fibers and the planar waveguides at 39. The pump source 310 is driven by laser drive 311 and circuit control 312. The pump waveguide 37 guides pump power to the main waveguide 35, coupling most of the power to it, possibly in a polarization dependant manner. The coupling waveguide 36 allows for a small fraction of the pump power to be guided to the monitor detector 313. The substrate has an angled surface (not shown) with a reflective coating thereon underneath the monitor-detector to provide means for coupling the light from the waveguide 36 to the monitor-detector 313. This angled surface could be cut by a diamond saw or etched by conventional technique.

In addition to the amplifier driver circuit shown in FIG. 2, the same planar technology can be employed to design ring laser configurations where the active medium is located in a fiber external to the planar device. Further by suitable doping of rare earth elements in the main waveguide 35, direct pumping of the gain medium can be accomplished. Various devices can then be realized. For example, by disposing reflective gratings on the main waveguide 35 in regions adjacent to or in the active medium, linear laser cavities can be made. Tuneable lasers can then be fabricated in this simple, low-cost arrangement. Other means of tunability can be realized by external devices coupled to the gain medium through the v-groove alignment means. Typically, only a single, broad optical spectrum grating would be disposed on the main waveguide 35, and an external wavelength selective reflective member would provide a broadband tuning mechanism over the optical gain bandwidth of the gain medium.

Various modifications will become apparent to those of ordinary skill in the art. All such variations which basically rely on the teachings which this invention advances are considered within the scope of the invention.

We claim:

1. An apparatus for amplifying an optical signal, comprising:
   (a) A substrate having a top surface and a bottom surface, and a selected thickness between said top and bottom surfaces;
   (b) A first groove at a first end of said substrate and a second groove at a second end of said substrate, said grooves having optical fibers disposed therein;
   (c) A optical waveguide optically connecting said optical fibers;
   (d) A laser mounted on said substrate, said laser connected to said optical waveguide by a first coupling waveguide; and
   (e) An optical detector mounted on said substrate, said monitor optically coupled to said first coupling waveguide, whereby light from said laser is transmitted to said waveguide and at least one of said fibers and a portion of said light is transmitted to said detector for monitoring said laser.

2. An apparatus as recited in claim 1, wherein said first fiber transmits an optical signal, said optical signal is multiplexed with said light from said laser and said optical signal and said light from said laser are transmitted into said second optical fiber.

3. An apparatus as recited in claim 2, wherein said multiplexed optical signal and said laser light are transmitted into a gain medium, whereby said optical signal is amplified in said gain medium.

4. An apparatus as recited in claim 3, wherein said gain medium is a rare earth doped optical fiber and said laser light serves as a pump source for said doped fiber.

5. An apparatus for amplifying an optical signal, comprising:
   (a) A substrate having a top surface and a bottom surface, and a selected thickness between said top and bottom surfaces;
   (b) A first groove at a first end of said substrate and a second groove at a second end of said substrate, said grooves having optical fibers disposed therein;
   (c) A optical waveguide optically connecting said optical fibers;
   (d) A pump laser mounted on said substrate, said laser connected to said optical waveguide by a first coupling waveguide;
   (e) An optical detector mounted on said substrate, said monitor optically coupled to said first coupling waveguide;
   (f) An input optical signal transmitted via said first optical fiber to said waveguide; and
   (g) A multiplexer for multiplexing said light from said pump laser with said optical signal, said multiplexed signal transmitted via said second waveguide to a gain medium external to said substrate, whereby said pump laser light pumps said gain medium and said optical signal is amplified via stimulated emission resulting from said pumping of said gain medium.

6. An apparatus as recited in claim 5, wherein said multiplexer is an evanescent coupler made of a section of said waveguide and a section of said first coupling waveguide.

7. An apparatus as recited in claim 6, wherein said gain medium is a rare earth doped optical fiber and said laser light serves as a pump source for said doped fiber.

* * * * *